US009703429B2

(12) United States Patent
Fujii

(10) Patent No.: US 9,703,429 B2
(45) Date of Patent: Jul. 11, 2017

(54) TOUCH DETECTION DEVICE, TOUCH DETECTION SYSTEM AND TOUCH DETECTION METHOD

(71) Applicant: FUJITSU LIMITED, Kawasaki-shi, Kanagawa (JP)

(72) Inventor: Tomonori Fujii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/284,153

(22) Filed: May 21, 2014

(65) Prior Publication Data

US 2015/0061701 A1    Mar. 5, 2015

(30) Foreign Application Priority Data

Aug. 29, 2013  (JP) ................. 2013-178654

(51) Int. Cl.
*G01R 27/26* (2006.01)
*G06F 3/044* (2006.01)
*G06F 1/32* (2006.01)

(52) U.S. Cl.
CPC ............ *G06F 3/044* (2013.01); *G06F 1/3262* (2013.01); *G06F 2203/04106* (2013.01); *G06F 2203/04108* (2013.01)

(58) Field of Classification Search
CPC  G01R 27/2605; G01R 27/26; G01R 1/06711; G01R 1/07307; G06F 3/044; G06F 3/0428; G01D 5/24; G01D 5/241; G01D 5/2417; G01D 5/2405; F25B 2309/021; G01N 2001/2285; G01Q 70/16; Y10S 977/86
See application file for complete search history.

(56) References Cited

U.S. PATENT DOCUMENTS

| 5,670,887 A * | 9/1997 | Andermo ............. G01D 5/2415 324/660 |
| 7,797,115 B2 * | 9/2010 | Tasher ................. G01D 5/2405 324/658 |
| 2007/0229466 A1 * | 10/2007 | Peng ........................ G06F 3/044 345/173 |
| 2008/0122798 A1 | 5/2008 | Koshiyama et al. |
| 2010/0214254 A1 | 8/2010 | Tsai |

(Continued)

FOREIGN PATENT DOCUMENTS

| JP | 2010-092505 A | 4/2010 |
| JP | 2010-198596 A | 9/2010 |

(Continued)

OTHER PUBLICATIONS

JPOA, Office Action of Japanese Patent Application No. 2013-178654 dated Feb. 21, 2017 with Machine Translation.

*Primary Examiner* — Patrick Assouad
*Assistant Examiner* — Demetrius Pretlow
(74) *Attorney, Agent, or Firm* — Maschoff Brennan

(57) ABSTRACT

A touch detection device includes: a first sensor having a first capacitance; a monitoring unit configured to monitor the first capacitance of the first sensor at a first period; a determining unit configured to determine whether the first capacitance monitored by the monitoring unit exceeds a first threshold; and a period changing unit configured to change the first period into a second period that is shorter than the first period when the determining unit determines that the first capacitance exceeds the first threshold.

14 Claims, 6 Drawing Sheets

(56) References Cited

U.S. PATENT DOCUMENTS

| | | | |
|---|---|---|---|
| 2012/0127124 A1* | 5/2012 | Zanone | G06F 1/3231 |
| | | | 345/174 |
| 2012/0242608 A1 | 9/2012 | Koshiyama et al. | |
| 2012/0249460 A1* | 10/2012 | Mizutani | G06F 3/044 |
| | | | 345/173 |
| 2012/0268422 A1 | 10/2012 | Hirakawa et al. | |
| 2013/0021278 A1* | 1/2013 | Landau | G06F 3/044 |
| | | | 345/173 |
| 2013/0106710 A1* | 5/2013 | Ashbrook | G06F 3/0488 |
| | | | 345/173 |
| 2013/0265276 A1* | 10/2013 | Obeidat | G06F 3/044 |
| | | | 345/174 |
| 2013/0278560 A1 | 10/2013 | Yamaguchi | |
| 2014/0071080 A1* | 3/2014 | Cok | G06F 3/044 |
| | | | 345/174 |
| 2014/0198064 A1* | 7/2014 | Kim | G06F 3/044 |
| | | | 345/173 |
| 2014/0247245 A1* | 9/2014 | Lee | G06F 3/0416 |
| | | | 345/174 |
| 2014/0313146 A1* | 10/2014 | Munechika | G06F 3/041 |
| | | | 345/173 |

FOREIGN PATENT DOCUMENTS

| | | |
|---|---|---|
| JP | 2011-044004 | 3/2011 |
| JP | 2011-170712 | 9/2011 |
| WO | 2011/055534 A1 | 5/2011 |
| WO | 2012/090405 | 7/2012 |

\* cited by examiner

TOUCH DETECTION DEVICE, TOUCH DETECTION SYSTEM AND TOUCH DETECTION METHOD

CROSS-REFERENCE TO RELATED APPLICATION

This application is based upon and claims the benefit of priority from the prior Japanese Patent Application No. 2013-178654 filed on Aug. 29, 2013, the entire contents of which are incorporated herein by reference.

FIELD

The present disclosure relates to a touch detection device, a touch detection system and a touch detection method.

BACKGROUND

A capacitive touch button using a capacitive sensor is mounted on a computer, for example, a tablet terminal, a notebook-type personal computer, a smartphone or the like.

The related art is disclosed in Japanese Patent Laid-Open Publication No. 2010-92505.

SUMMARY

According to aspect of the embodiments, a touch detection device includes: a first sensor having a first capacitance; a monitoring unit configured to monitor the first capacitance of the first sensor at a first period; a determining unit configured to determine whether the first capacitance monitored by the monitoring unit exceeds a first threshold; and a period changing unit configured to change the first period into a second period that is shorter than the first period when the determining unit determines that the first capacitance exceeds the first threshold.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In a capacitive touch button, for example, one touch sensor channel is assigned for one button. The sensitivity of the sensor is adjusted and it is determined whether the button is pressed or not-pressed. The capacitive sensor is used as a proximity sensor by increasing its sensitivity.

If the capacitive touch button using the capacitive sensor is utilized, the consumption of electric power may be increased.

For example, when a computer uses the capacitive touch button as an interruptible button, the power supply of a controller configured to control the button is turned ON, so that power may be consumed. Power consumption is proportional to the number of channels used to detect the touching of the touch button and a sampling period. If the sampling period is increased, the reaction becomes fast when pressing the button, so that power consumption may be increased although the user's convenience may be improved.

Figure 1:
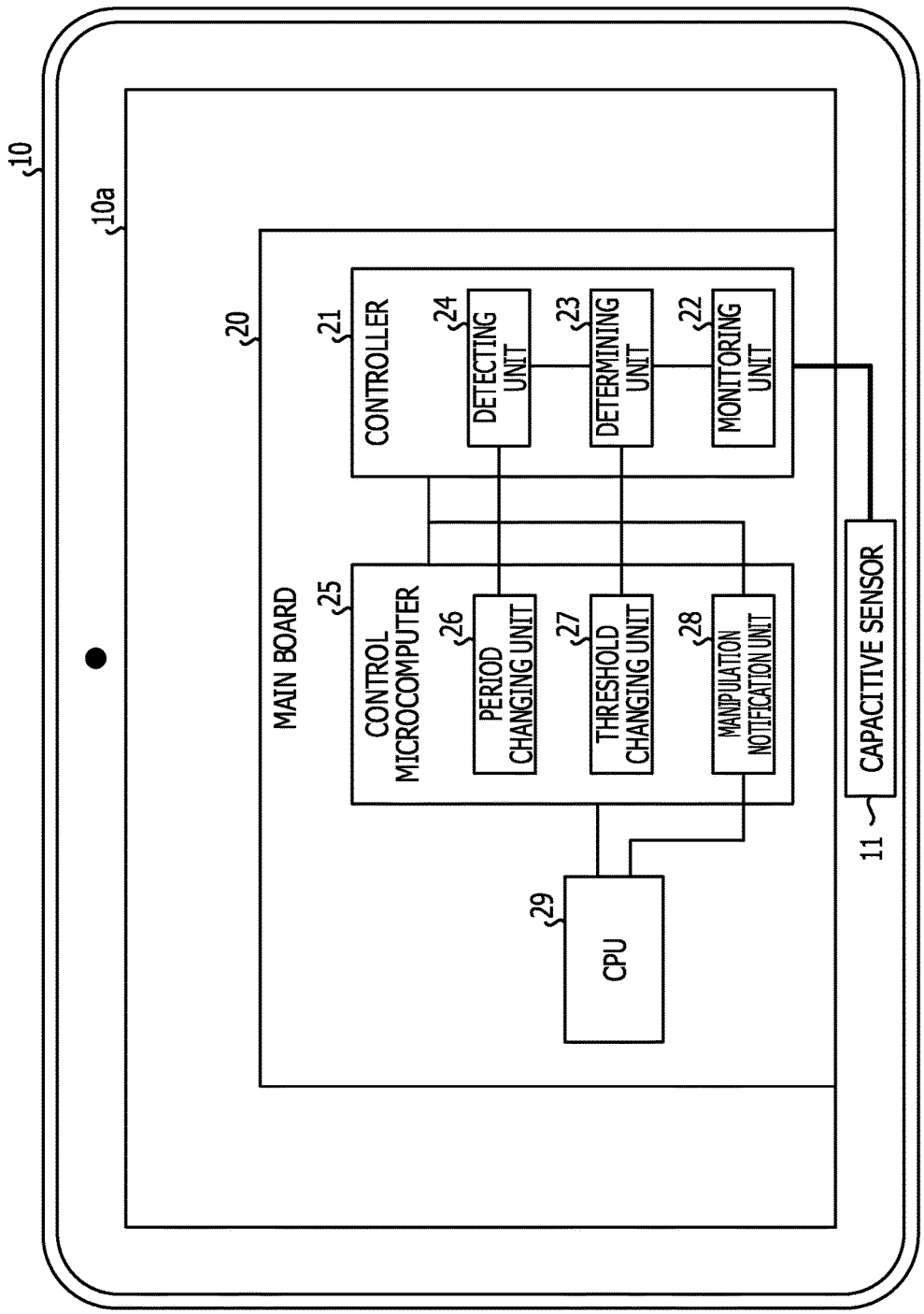
FIG. 1 illustrates an exemplary device.

FIG. 1 illustrates an exemplary device. The device may be a tablet terminal 10 as illustrated in FIG. 1. Alternatively, the device may be a smartphone, or a notebook personal computer having a touch panel.

The tablet terminal 10 illustrated in FIG. 1 includes a touch panel 10*a*, and receives a user manipulation on the touch panel 10*a* to execute various processes. The tablet terminal 10 includes a capacitive sensor 11 and a main board 20. The capacitive sensor 11 may be installed at any position without being limited to a position illustrated in FIG. 1.

The capacitive sensor 11 may be a capacitive touch sensor button. For example, the capacitive sensor 11 may be a switch that detects a change in capacitance of a condenser formed by a metallic detection panel provided on the capacitive sensor 11 and a conductor such as a human body. For example, the capacitance value of the capacitive sensor 11 may become smaller, as the distance between the capacitive sensor 11 and a person's palm or the like increases. Also, the capacitance value of the capacitive sensor 11 may become larger, as the distance between the capacitive sensor 11 and the person's palm oe the like is reduced.

The main board 20 may be a substrate that is set in the tablet terminal 10, and provided with a controller 21, a control microcomputer 25, and a central processing unit (CPU) 29. The controller 21 may be an electronic circuit equipped with a monitoring unit 22, a determining unit 23 and a detecting unit 24, and detects whether a user is approaching or not.

The monitoring unit 22 monitors the capacitance of the capacitive sensor 11 at a certain sampling period. For example, the monitoring unit 22 monitors a change in capacitance of the capacitive sensor 11 at a sampling period that is set by a period changing unit 26. For example, the monitoring unit 22 calculates the variation between the capacitance acquired previously from the capacitive sensor 11 and the capacitance acquired at this time, and then outputs the calculated result to the determining unit 23.

The determining unit 23 determines whether the capacitance monitored by the monitoring unit 22 exceeds a threshold. For example, the determining unit 23 determines whether the variation of capacitance input from the monitoring unit 22 exceeds a threshold that is set by a threshold changing unit 27. When it is determined that the variation of the capacitance exceeds the threshold, the determining unit 23 notifies the period changing unit 26 and the threshold changing unit 27 that the variation exceeds the threshold. For example, the determining unit 23 detects a user's approach by the change in capacitance, and notifies the period changing unit 26 and the threshold changing unit 27 of the detected result.

The detecting unit 24 detects that the button on the capacitive sensor 11 or the touch panel is pressed. For example, when it is detected that the button on the capacitive sensor 11 or the touch panel is manipulated by a user, the detecting unit 24 outputs the information on manipulation to a manipulation notification unit 28. The information on manipulation may include a manipulated position, a manipulated time, or a time period when the capacitive sensor 11 is continuously pressed. The information on manipulation may include information as to when a general touch panel or a general capacitive sensor is manipulated.

The control microcomputer 25 includes the period changing unit 26, the threshold changing unit 27, and the manipulation notification unit 28, and may be an electronic circuit that controls a threshold used by the determining unit 23 or a sampling period of the monitoring unit 22. The control microcomputer 25 detects a user's manipulation, and then notifies the CPU 29 of the information on manipulation.

When the determining unit 23 determines that the capacitance exceeds the threshold, the period changing unit 26 changes the period of monitoring the capacitance by the monitoring unit 22 to be shorter. For example, until the user's approach is detected, the period changing unit 26 sets a long sampling period in the monitoring unit 22 such that the monitoring unit 22 monitors the capacitance with the long sampling period. When the user's approach is detected, the period changing unit 26 changes the setting into a short sampling period such that the monitoring unit 22 monitors the capacitance more frequently.

For example, in a standby state where the user's detection is being waited, the period changing unit 26 lengthens the interval of monitoring the capacitance of the capacitive sensor 11 by the monitoring unit 22. Since the sampling period is set to be long while the capacitive sensor 11 is used as a proximity sensor, the number of times of monitoring decreases, and consequently power consumption required for monitoring may be reduced.

In an operation state after the user is detected, the period changing unit 26 shortens the interval of monitoring the capacitance of the capacitive sensor 11 by the monitoring unit 22. Since the sampling period while the capacitive sensor 11 is used as the touch sensor is set to be short, the number of times of monitoring increases so that the reaction speed may increases when the sensor is manipulated, which may improve the user's convenience.

When the determining unit 23 determines that the capacitance exceeds the threshold, the threshold changing unit 27 changes the threshold to be used for determination by the determining unit 23 to a larger threshold. For example, the threshold changing unit 27 sets a small threshold in the determining unit 23 until the user's approach is detected, and, then, sets a large threshold in the determining unit 23 when the user's approach is detected.

For example, while the capacitive sensor 11 is used as the proximity sensor in the standby state where the user's detection is being waited, the threshold changing unit 27 sets the threshold of determining the change in capacitance by the determining unit 23 to be a smaller value, and increases the sensitivity of the capacitive sensor 11.

While the capacitive sensor 11 is used as the touch sensor in the operation state after the user is detected, the threshold changing unit 27 sets the threshold of determining the change in capacitance by the determining unit 23 to be a larger value, and reduces the sensitivity of the capacitive sensor 11.

With the control described above, while the capacitive sensor 11 is used as the proximity sensor, the determining unit 23 may detect the approach of a human body even though the distance between the sensor and the human body is long and the change in capacitance is small. Meanwhile, while the capacitive sensor 11 is used as the touch sensor, the determining unit 23 may detect the user's manipulation when the distance between the sensor and the human body is short and the change in capacitance increases, and may not detect the user's manipulation when the distance between the sensor and the human body is long and the change in capacitance is small.

The manipulation notification unit 28 acquires information on the user's manipulation detected by the capacitive sensor 11 from the detecting unit 24 and notifies the CPU 29 of the information.

The CPU 29 may be an electronic circuit that controls the entire process of the tablet terminal 10. For example, the CPU 29 specifies the user's manipulation based on the manipulation information notified from the manipulation notification unit 28, and executes the specified manipulation. For example, the CPU 29 executes an application, and an arithmetic operation such as a calculation, and then, displays, for example, a calculated result on the touch panel 10a.

Figure 2:
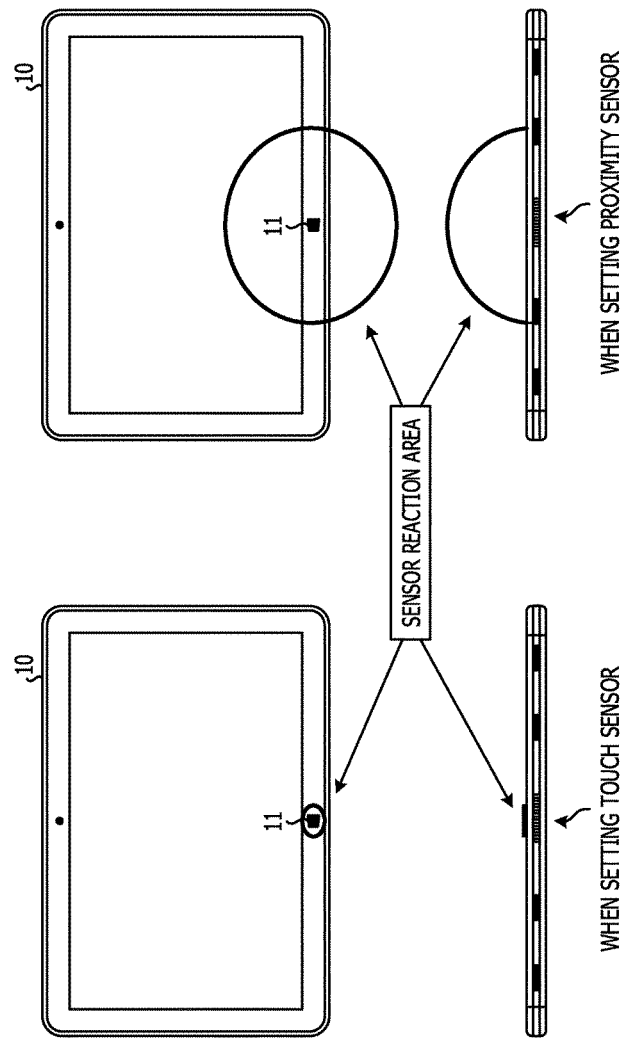
FIG. 2 illustrates an example of a reaction image of a proximity sensor.

FIG. 2 illustrates an exemplary reaction image of a proximity sensor. The right side drawing of FIG. 2 illustrates the reaction range when the capacitive sensor 11 is used as the proximity sensor. When the capacitive sensor 11 is used as the proximity sensor, the sampling period of the capacitive sensor 11 is long and the determination threshold is small. Hence, the determining unit 23 detects a user's approach even if the change in capacitance of the capacitive sensor 11 is small. For example, since the proximity sensor detects a user who is distant from the capacitive sensor 11, the sensor illustrated in the right side drawing of FIG. 2 has a wider reaction area and a higher sensitivity as compared to the sensor illustrated in the left side drawing of FIG. 2.

The left side drawing of FIG. 2 illustrates the reaction range when the capacitive sensor 11 is used as the touch sensor. When the capacitive sensor 11 is used as the touch sensor, the sampling period of the capacitive sensor 11 is short and the determination threshold is large. Hence, the determining unit 23 detects the user's manipulation which causes the change in capacitance of the capacitive sensor 11 to be increased. For example, since the touch sensor detects the approach or manipulation of a user who is situated near the capacitive sensor 11, the sensor illustrated in the left side drawing of FIG. 2 has a narrower reaction area and a lower sensitivity as compared to the sensor illustrated in the right side drawing of FIG. 2.

Figure 3:
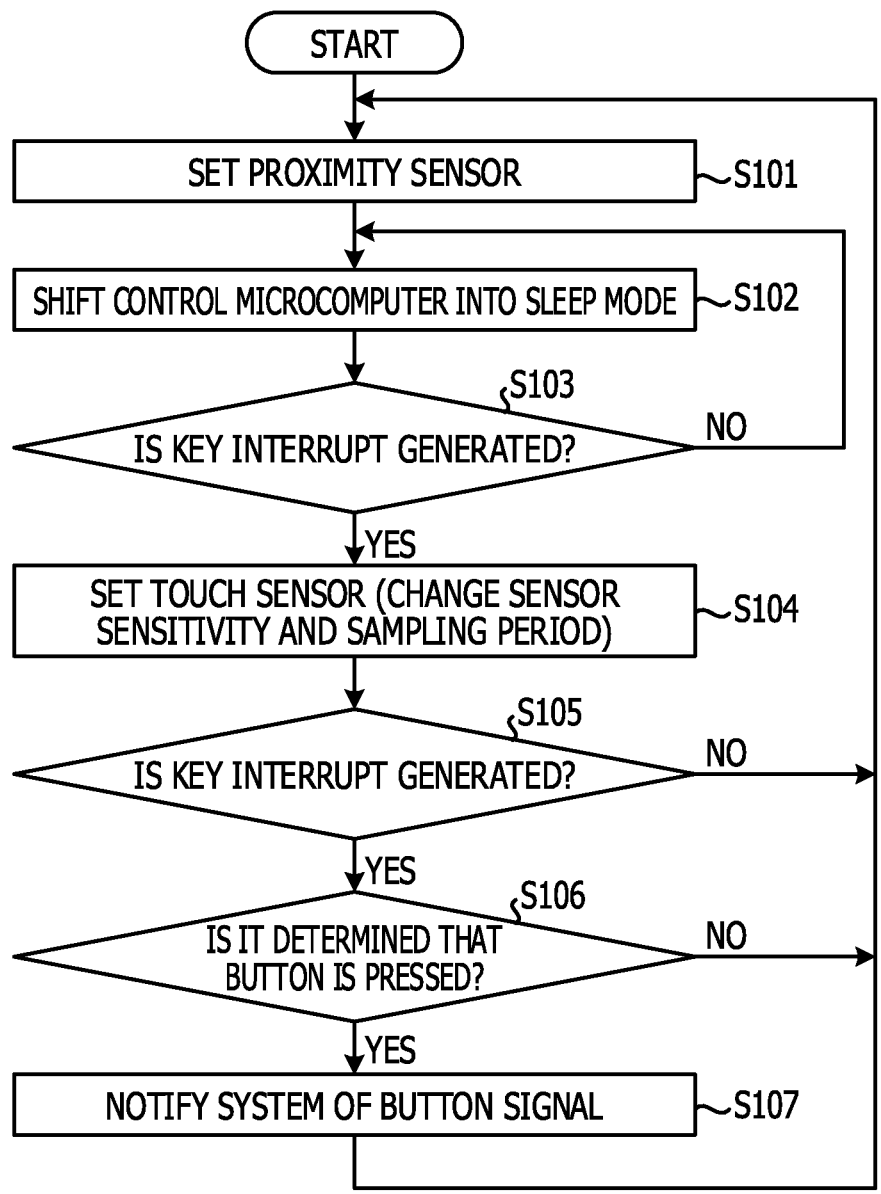
FIG. 3 illustrates an exemplary processing flow.

FIG. 3 illustrates an exemplary process. As illustrated in FIG. 3, the main board 20 sets the capacitive sensor 11 as a proximity sensor at S101, and transfers the control microcomputer to a sleep mode at S102.

For example, the period changing unit 26 sets the sampling period to be a longer period, and the threshold changing unit 27 changes the determination threshold into a small threshold so as to increase the sensitivity. Hence, the capacitive sensor 11 is operated as the proximity sensor.

The main board 20 maintains the state of S102 until a key interrupt is generated (S103: No), and when the key interrupt is generated (S103: Yes), the main board 20 executes the setting of the touch sensor (S104).

For example, the determining unit 23 generates an interrupt when the change in capacitance of the capacitive sensor 11 exceeds the threshold in the proximity sensor mode, and notifies the control microcomputer 25 of the occurrence of the interrupt. Based on the notification, the period changing unit 26 changes the sampling period into a shorter period. The threshold changing unit 27 changes the threshold to be used for determination into a larger threshold, and lowers the sensitivity of the capacitive sensor 11.

The main board 20 transfers the process into the state of step S101 when the key interrupt is not generated any more (S105: No), and determines whether the button is pressed or not (S106) when the key interrupt is further generated (S105: Yes).

For example, when the change in capacitance of the capacitive sensor 11 exceeds the threshold in the touch sensor mode within a certain time period, e.g. 5 seconds after the touch sensor is set, the determining unit 23 generates the interrupt and notifies the control microcomputer 25 of the occurrence of the interrupt. If the change in capacitance of the capacitive sensor 11 does not exceed the threshold in the touch sensor mode within a certain time period, e.g. 5 seconds, the period changing unit 26 and the threshold changing unit 27 execute the setting of the proximity sensor.

When the button of the capacitive sensor 11 or the button on the touch panel 10a is pressed (S106: Yes), the main board 20 notifies the system of a button signal (S107). When the button of the capacitive sensor 11 or the button on the touch panel 10a is not pressed (S106: No), the process returns to step S101 and the above-mentioned operations are repeated.

For example, when the detecting unit 24 detects the pressing of the button within the certain time period, the manipulation notification unit 28 transmits the button signal that is the manipulation notification of the button to the CPU 29. Thus, the CPU 29 executes the process according to the pressed button. When the pressing of the button is not detected by the detecting unit 24 within the certain time period, the period changing unit 26 and the threshold changing unit 27 execute the setting of the proximity sensor.

Figure 4:
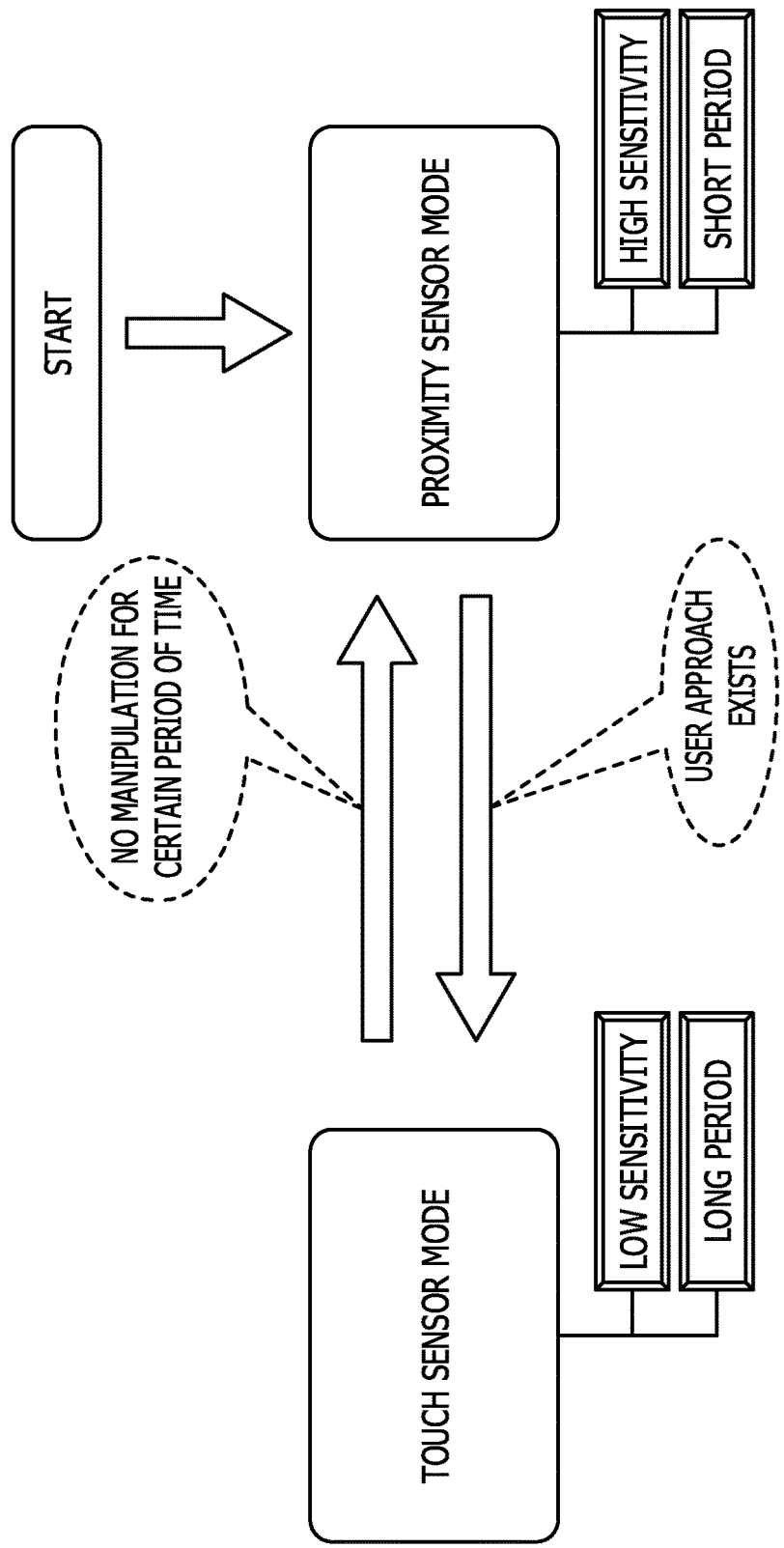
FIG. 4 illustrates an exemplary state transition.

FIG. 4 illustrates an example of a state transition. As illustrated in FIG. 4, the tablet terminal 10 is activated based on the power supply, and operates the capacitive sensor 11 in the proximity sensor mode. For example, after activation, the tablet terminal 10 is set in such a manner that the sampling period becomes a longer period and the determination threshold becomes a smaller one. Thus, the monitoring interval of the capacitive sensor 11 is lengthened and the sensitivity is increased.

When the user's approach is detected in the proximity sensor mode, the tablet terminal 10 operates the capacitive sensor 11 in the touch sensor mode. For example, after the user's approach is detected, the tablet terminal 10 is set in such a manner that the sampling period becomed a shorter period and the determination threshold becomes a smaller one. Thus, the monitoring interval of the capacitive sensor 11 is shortened and the sensitivity is reduced.

When the user's approach or manipulation is not detected for the certain time period in the touch sensor mode, the tablet terminal 10 shifts the capacitive sensor 11 from the touch sensor mode to the proximity sensor mode. For example, in the tablet terminal 10, the monitoring interval of the capacitive sensor 11 is lengthened and the sensitivity is increased.

In the tablet terminal 10, the capacitive sensor 11 is operated in the proximity sensor mode at a normal operation. When the user is detected, the tablet terminal is shifted into the touch sensor mode, and when the user is not detected, the tablet terminal returns to the proximity sensor mode again.

The monitoring period of the capacitive sensor is set to be a longer period so that the capacitive sensor is used as the proximity sensor. When the user's approach is detected while the capacitive sensor is used as the proximity sensor, the monitoring period is changed into a shorter period so that the capacitive sensor is used as the touch sensor. As a result, the power consumption may be reduced. Power saving and improvement in user's convenience may be compatible.

When the proximity sensor makes a reaction, the control microcomputer 25 is notified of the reaction. Upon being notified of the reaction, the control microcomputer 25 reduces the sensitivity of the capacitive sensor 11 to the touch sensor level, then increases a sampling frequency, and switches the capacitive sensor 11 into the touch sensor that has a characteristic of a fast response. Therefore, the power may be saved without changing the hardware design of the touch sensor button.

The capacitive sensor 11 may include a plurality of sensors.

Figure 5:
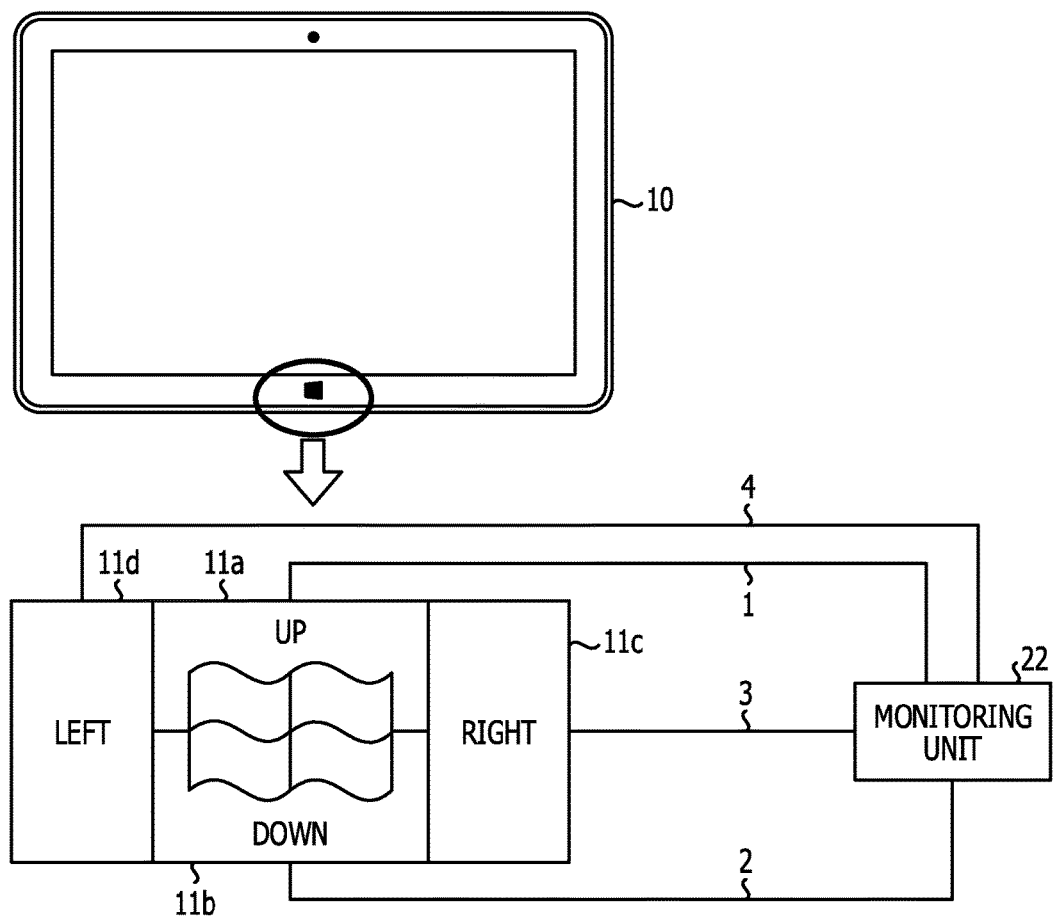
FIG. 5 illustrates an exemplary device.

FIG. 5 illustrates an exemplary device. The capacitive sensor 11 of FIG. 5 includes an upper sensor 11a, a lower sensor 11b, a right sensor 11d, and a left sensor 11d. The main board 20 of FIG. 5 may be substantially equal or similar in configuration to the main board 20 of FIG. 1, and a detailed description thereof may be omitted or reduced.

The upper sensor 11a is coupled to the monitoring unit 22 via a channel 1, the lower sensor 11b is coupled to the monitoring unit 22 via a channel 2, the right sensor 11c is coupled to the monitoring unit 22 via a channel 3, and the left sensor 11d is coupled to the monitoring unit 22 via a channel 4.

The monitoring unit 22 monitors the capacitance of each sensor using each channel at a sampling period set by the period changing unit 26. When it is determined that the change in capacitance of any one of the sensors monitored by the monitoring unit 22 exceeds the threshold, the determining unit 23 determines that the user is approaching. The control microcomputer 25 changes the period and threshold such that each sensor is shifted from the proximity sensor mode to the touch sensor mode.

The control microcomputer 25 may use any one of four sensors as the proximity sensor. For example, the control microcomputer 25 causes the controller 21 to set the upper sensor 11a as the proximity sensor and restrain the control of other sensors.

For example, the monitoring unit 22 monitors the change in capacitance of the upper sensor 11a via the channel 1 at a longer sampling period. The monitoring unit 22 suppresses the monitoring of the lower sensor 11b, the right sensor 11c, and the left sensor 11d. The determining unit 23 determines whether the change in capacitance of the upper sensor 11a exceeds the threshold with reference to a smaller threshold.

When the user's approach is detected by the upper sensor 11a, the control microcomputer 25 sets each sensor as the touch sensor. For example, the monitoring unit 22 monitors the change in capacitance of each sensor with a shorter sampling period via each channel. The determining unit 23 determines whether the change in capacitance of each sensor exceeds the threshold with reference to a larger threshold.

When the capacitive sensor 11 is used as the proximity sensor, the number of monitoring channels is reduced. Thus, power saving may be further enhanced. When the capacitive sensor 11 is used as the touch sensor, the number of monitoring channels is increased. Thus, the user's convenience may be improved.

The capacitive sensor 11 may include a plurality of sensors that can be used either as the proximity sensor or the touch sensor, according to the purpose.

Figure 6:
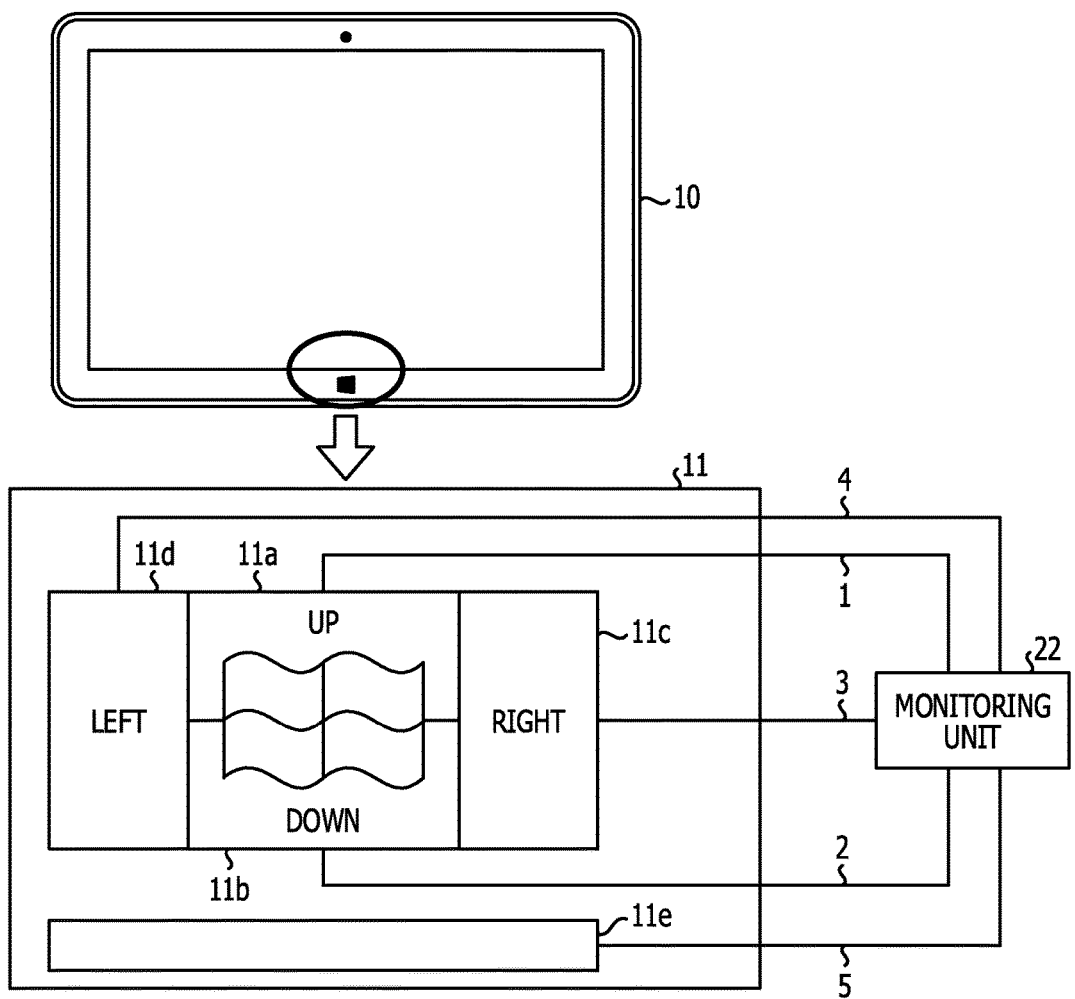
FIG. 6 illustrates an exemplary device.

FIG. 6 illustrates an exemplary device. As illustrated in FIG. 6, the capacitive sensor 11 includes an upper sensor 11a, a lower sensor 11b, a right sensor 11c, and a left sensor 11d. The capacitive sensor 11 further includes a sensor 11e. The main board 20 of FIG. 6 may be substantially equal or similar in configuration to the main board 20 of FIG. 1, and a detailed description thereof may be omitted or reduced.

The control microcomputer 25 uses the sensor 11e as the proximity sensor, and uses other sensors as the touch sensor. For example, the control microcomputer 25 causes the controller 21 to set the sensor 11e as the proximity sensor. The control microcomputer 25 causes the controller 21 to set the upper sensor 11a, the lower sensor 11b, the right sensor 11c, and the left sensor 11d as the touch sensor.

Thus, the monitoring unit 22 monitors the capacitance of the sensor 11e via the channel 5 at the longer sampling period, and suppresses the monitoring of the upper sensor 11a, the lower sensor 11b, the right sensor 11c, and the left sensor 11d. When the determining unit 23 determines that the change in capacitance exceeds the threshold, the monitoring unit 22 switches an object to be monitored based on the instruction of the control microcomputer 25. The monitoring unit 22 switches the monitoring of the sensor 11e via the channel 5 into the monitoring of the upper sensor 11a, the lower sensor 11b, the right sensor 11c, and the left sensor 11d via respective channels. In this case, the monitoring unit 22 monitors the change in capacitance of the upper sensor 11a, lower sensor 11b, right sensor 11c, and left sensor 11d with reference to the shorter sampling period. The monitoring unit 22 suppresses the monitoring of the sensor 11e.

Since the switching control of monitoring for one channel is restrained, power saving may be further enhanced. Even if any one of the sensors is out of order, a control may be performed using other sensors, so that the reliability may be improved.

For example, the sampling period for the proximity sensor mode may be set as 10 ms, and the sampling period for the touch sensor mode may be set as 1 ms. The determination threshold as the capacitance variation may be set as 5 F (farad) for the proximity sensor mode, and as 30 F for the touch sensor mode. All or part of the above-mentioned operations may be performed either automatically or manually. The above-mentioned processing sequence, control sequence, specific names or information including various data or parameter may be optionally changed. Each component of each device may be a functionally conceptual one, and may not be illustrated physically. For example, all or part of the components of each device may be either distributed functionally or physically or integrated in any unit depending on various load or use conditions. All or part of each processing function performed in each device may be realized by a CPU and a program that is analyzed and executed in the CPU, or may be realized as a hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A touch detection device comprising:
    a first sensor having a first capacitance and including a plurality of sub-sensors each having a second capacitance; and
    a controller configured to:
        monitor the first capacitance of the first sensor at a first period,
        calculate, as a variation of the first capacitance, a difference between a previous first capacitance acquired from the first sensor at a previous first period and a current first capacitance acquired from the first sensor at a current first period,
        determine whether the variation of the first capacitance exceeds a first threshold and
        change the first period into a second period that is shorter than the first period when the variation of the first capacitance exceeds the first threshold,
    wherein, when the variation of the second capacitance does not exceed the first threshold, the controller monitors the second capacitance for one of the plurality of sub-sensors at the first period and restrains monitoring of the remaining sub-sensors, and, when the variation of the second capacitance exceeds the first threshold, the controller monitors the second capacitance for each of the plurality of sub-sensors at the second period.

2. The touch detection device of claim 1, wherein the first capacitance of the first sensor is increased as a distance to a conductor is reduced.

3. The touch detection device of claim 1, further comprising:
    a processor configured to change the first threshold into a second threshold that is larger than the first threshold when the controller determines that the variation of the first capacitance exceeds the first threshold.

4. The touch detection device of claim 1, wherein
    the processor changes a monitoring period for the plurality of sub-sensors from the first period to the second period when the variation of the second capacitance of one of the plurality of sub-sensors exceeds the first threshold.

5. The touch detection device of claim 1, further comprising a second sensor having a third capacitance,
    wherein the controller monitors the variation of the third capacitance of the second sensor when the variation of the third capacitance does not exceed the first threshold, and monitors the variation of the first capacitance of the first sensor when the variation of the third capacitance exceeds the first threshold.

6. A touch detection system, comprising:
    a capacitive sensor having a first capacitance and including a plurality of sub-sensors each having a second capacitance;
    a controller configured to detect the first capacitance and calculate, as a variation of the capacitance, a difference between a previous first capacitance acquired from the capacitive sensor at a previous first period and a current first capacitance acquired from the capacitive sensor at a current first period; and
    a control microcomputer configured to instruct, based on the variation of the first capacitance detected by the controller and a first threshold, to change a use of the capacitive sensor from a first sensor which is detected at a first period to a second sensor which is detected at a second period,
    wherein, when the variation of the second capacitance does not exceed the first threshold, the control microcomputer monitors the second capacitance for one of the plurality of sub-sensors at the first period and restrains monitoring of the remaining sub-sensors, and, when the variation of the second capacitance exceeds the first threshold, the control microcomputer monitors the second capacitance for each of the plurality of sub-sensors at the second period.

7. The touch detection system of claim 6, wherein the control microcomputer switches the capacitive sensor from a use of the first sensor to a use of the second sensor, based on a detection result that the variation of the capacitance exceeds the first threshold.

8. The touch detection system of claim 6, wherein the first period is longer than the second period.

9. The touch detection system of claim 6, wherein, when the capacitive sensor is switched into the second sensor, the first threshold is changed into a second threshold.

10. A touch detection method, comprising:
   detecting a first capacitance from a first sensor including a plurality of sub-sensors each having a second capacitance;
   calculating, as a variation of the first capacitance, a difference between a previous first capacitance acquired from the first sensor at a previous first period and a current first capacitance acquired from the first sensor at a current first period,
   determining whether the variation of the first capacitance exceeds a first threshold at a first period; and
   changing the first period into a second period that is shorter than the first period by a computer when the variation of the first capacitance exceeds the first threshold,
   wherein, when the variation of the second capacitance does not exceed the first threshold, the second capacitance for one of the plurality of sub-sensors is monitored at the first period and monitoring of the remaining sub-sensors is restrained, and, when the variation of the second capacitance exceeds the first threshold, the second capacitance for each of the plurality of sub-sensors is monitored at the second period.

11. The touch detection method claim 10, wherein, further comprising:
   changing the first threshold into a second threshold that is larger than the first threshold when determining the variation of the first capacitance exceeds the first threshold.

12. The touch detection device of claim 1, wherein the first threshold is a threshold for determining a period of monitoring the first capacitance.

13. The touch detection of claim 6, wherein the first threshold is a threshold for determining a period of monitoring the first capacitance.

14. The touch detection method of claim 10, wherein the first threshold is a threshold for determining a period of monitoring the first capacitance.

* * * * *